(12) United States Patent
Bish et al.

(10) Patent No.: US 10,409,978 B2
(45) Date of Patent: *Sep. 10, 2019

(54) HYPERVISOR AND VIRTUAL MACHINE PROTECTION

(71) Applicant: International Business Machines Corporation, Armonk, NY (US)

(72) Inventors: Thomas W. Bish, Tucson, AZ (US); Nikhil Khandelwal, Tucson, AZ (US); Gregory E. McBride, Vail, AZ (US); Aaron S. Palazzolo, Tucson, AZ (US); David C. Reed, Tucson, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/961,760

(22) Filed: Apr. 24, 2018

(65) Prior Publication Data

US 2018/0239892 A1    Aug. 23, 2018

Related U.S. Application Data

(63) Continuation of application No. 15/471,911, filed on Mar. 28, 2017, now Pat. No. 9,984,227, which is a
(Continued)

(51) Int. Cl.
*G06F 21/44* (2013.01)
*G06F 9/455* (2018.01)
*G06F 21/53* (2013.01)

(52) U.S. Cl.
CPC .......... *G06F 21/44* (2013.01); *G06F 9/45558* (2013.01); *G06F 21/53* (2013.01);
(Continued)

(58) Field of Classification Search
None
See application file for complete search history.

(56) References Cited

U.S. PATENT DOCUMENTS 7,814,495 B1 * 10/2010 Lim ..................... G06F 9/45558
                                                            718/104
8,909,939 B1    12/2014 Beda, III et al.
(Continued)

FOREIGN PATENT DOCUMENTS

CN          1585927 A       2/2005
CN        102208000 A      10/2011
(Continued)

OTHER PUBLICATIONS

List of IBM Patents or Patent Applications Treated as Related.
(Continued)

*Primary Examiner* — Kaveh Abrishamkar
(74) *Attorney, Agent, or Firm* — Zilka-Kotab, P.C.

(57) ABSTRACT

A computer-implemented method, according to one embodiment, includes: determining, using a processor, whether a virtual machine is authorized to run using a data structure having metadata about properties of the virtual machine; determining, using the processor, whether a hypervisor is authorized to run the virtual machine using a digital signature of the data structure; and running the virtual machine on a computer system using the hypervisor in response to determining that the virtual machine is authorized to be run and that the hypervisor is authorized to run the virtual machine. Other systems, methods, and computer program products are described in additional embodiments.

20 Claims, 5 Drawing Sheets

Related U.S. Application Data continuation of application No. 14/489,320, filed on Sep. 17, 2014, now Pat. No. 9,652,276.

(52) U.S. Cl.
CPC .............. *G06F 2009/45587* (2013.01); *G06F 2221/2107* (2013.01); *G06F 2221/2147* (2013.01)

(56) References Cited

U.S. PATENT DOCUMENTS

| | | | |
|---|---|---|---|
| 9,652,276 B2* | 5/2017 | Bish | G06F 9/45558 |
| 9,984,227 B2* | 5/2018 | Bish | G06F 9/45558 |
| 2008/0244569 A1 | 10/2008 | Challener et al. | |
| 2010/0082991 A1 | 4/2010 | Baldwin et al. | |
| 2010/0115291 A1 | 5/2010 | Buer | |
| 2010/0122250 A1* | 5/2010 | Challener | G06F 8/61 718/1 |
| 2011/0271279 A1* | 11/2011 | Pate | G06F 21/53 718/1 |
| 2011/0296409 A1 | 12/2011 | Lo et al. | |
| 2011/0302415 A1 | 12/2011 | Ahmad et al. | |
| 2012/0179904 A1* | 7/2012 | Dunn | G06F 21/6209 713/155 |
| 2012/0324239 A1 | 12/2012 | Falk et al. | |
| 2013/0097296 A1 | 4/2013 | Gehrmann et al. | |
| 2013/0145179 A1 | 6/2013 | Rangegowda et al. | |
| 2013/0145433 A1 | 6/2013 | Akelbein et al. | |
| 2013/0254831 A1 | 9/2013 | Roach et al. | |
| 2013/0305348 A1 | 11/2013 | Silverstone | |
| 2013/0318595 A1* | 11/2013 | Wang | G06F 9/45558 726/16 |
| 2014/0013325 A1* | 1/2014 | Shimoni | G06F 9/45558 718/1 |
| 2014/0068704 A1 | 3/2014 | Grewal et al. | |
| 2014/0115689 A1 | 4/2014 | Lee | |
| 2014/0208097 A1 | 7/2014 | Brandwine et al. | |
| 2015/0134965 A1* | 5/2015 | Morenius | G06F 21/57 713/172 |
| 2015/0178504 A1* | 6/2015 | Nystrom | G06F 9/45533 713/2 |
| 2015/0244710 A1 | 8/2015 | Koster et al. | |
| 2016/0078212 A1 | 3/2016 | Bish et al. | |
| 2017/0200000 A1 | 7/2017 | Bish et al. | |
| 2017/0244710 A1* | 8/2017 | Hopen | H04L 12/2856 |

FOREIGN PATENT DOCUMENTS

| | | |
|---|---|---|
| CN | 102667791 A | 9/2012 |
| CN | 102667803 A | 9/2012 |
| CN | 103069428 A | 4/2013 |
| CN | 103270518 A | 8/2013 |
| EP | 2261832 A1 | 12/2010 |
| WO | 2013174437 A1 | 11/2013 |
| WO | 2014057369 A1 | 4/2014 |

OTHER PUBLICATIONS

Bish et al., U.S. Appl. No. 14/489,320, filed Sep. 17, 2014.
Ferrie, P., "Attacks on More Virtual Machine Emulators," Symantec Advanced Threat Research, Aug. 31, 2007, pp. 1-17.
Microsoft, "Introduction to Code Signing," Microsoft Developer Network, downloaded May 22, 2014, pp. 1-19, retrieved from http://msdn.microsoft.com/en-us/library/ms537361.aspx.
International Search Report and Written Opinion from PCT Application No. PCT/IB2015/056421, dated Dec. 12, 2015.
Non-Final Office Action from U.S. Appl. No. 14/489,320, dated Sep. 2, 2016.
Notice of Allowance from U.S. Appl. No. 14/489,320, dated Jan. 13, 2017.
Bish et al., U.S. Appl. No. 15/471,911, filed Mar. 28, 2017.
Non-Final Office Action from U.S. Appl. No. 15/471,911, dated Jul. 3, 2017.
Examination Report from European Application No. GB1704797.8, dated Aug. 24, 2017.
Final Office Action from U.S. Appl. No. 15/471,911, dated Nov. 13, 2017.
Notice of Allowance from U.S. Appl. No. 15/471,911, dated Jan. 24, 2018.
Office Action from Chinese Patent Application No. 201580048447.9, dated Feb. 28, 2019.

* cited by examiner

HYPERVISOR AND VIRTUAL MACHINE PROTECTION

BACKGROUND

The present invention relates to data protection, and more specifically, this invention relates to hypervisor and Virtual Machine (VM) security frameworks using a centralized authority with revocation capability.

In computing, a VM is an emulation of a particular computer system. Virtual machines operate based on the computer architecture and functions of a real or hypothetical computer, and their implementations may involve specialized hardware, software, or a combination thereof.

A hypervisor, sometimes referred to as a virtual machine monitor, is a piece of computer software, firmware and/or hardware which is able to create and/or run VMs. Moreover, an overlay network can be implemented using a certain number of VM wherein a hypervisor controls the processing of networking packets in and out of each VM, one or more of which may be associated with an overlay network.

Data protection and security are becoming increasingly important between VMs and hypervisors. As technology changes over time, malicious activity and theft transform to take advantage of new exposures that are created. Moreover, sensitivity of the data vulnerable to such attacks underscores the importance and impact of these threats.

Today there is little other than standard antivirus programs that protect VMs and hypervisors, among other VM monitors. Often when a malicious VM is started, it can cause damage before even being recognized these standard antivirus programs. Also, with current backup and replication practices, once malicious software is introduced to a virtual network, it can be almost impossible to completely remove the malicious software from the user's portfolio of systems.

SUMMARY

A computer-implemented method, according to one embodiment, includes: determining, using a processor, whether a virtual machine is authorized to run using a data structure having metadata about properties of the virtual machine; determining, using the processor, whether a hypervisor is authorized to run the virtual machine using a digital signature of the data structure; and running the virtual machine on a computer system using the hypervisor in response to determining that the virtual machine is authorized to be run and that the hypervisor is authorized to run the virtual machine.

A computer program product, according to another embodiment, includes a computer readable storage medium having program instructions embodied therewith. The computer readable storage medium is not a transitory signal per se. Moreover, the program instructions readable and/or executable by a processor to cause the processor to perform a method which includes: determining, by the processor, whether a virtual machine is authorized to run using a data structure having metadata about properties of the virtual machine; determining, by the processor, whether a hypervisor is authorized to run the virtual machine using a digital signature of the data structure; and running, by the processor, the virtual machine on a computer system using the hypervisor in response to determining that the virtual machine is authorized to be run and that the hypervisor is authorized to run the virtual machine.

A system, according to yet another embodiment, includes: a processor and logic integrated with and/or executable by the processor, the logic being configured to: determine whether a virtual machine is authorized to run using a data structure having metadata about properties of the virtual machine; determine whether a hypervisor is authorized to run the virtual machine using a digital signature of the data structure; and run the virtual machine on a computer system using the hypervisor in response to determining that the virtual machine is authorized to be run and that the hypervisor is authorized to run the virtual machine.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing hypervisor and VM security frameworks using a centralized authority with revocation capability. It follows that various embodiments described herein are preferably able to improve protection in hypervisors and VMs as will be described in further detail below.

In one general embodiment, a method includes receiving a request for a hypervisor to run a virtual machine, determining whether the virtual machine is authorized to run using a data structure having metadata about properties of the virtual machine, determining whether the hypervisor is authorized to run the virtual machine using a digital signature of the data structure, receiving a decryption key from a key authority when it is determined that the virtual machine is authorized to be run and it is determined that the hypervisor is authorized to run the virtual machine, unlocking and/or decrypting the virtual machine using the decryption key, and running the virtual machine.

In another general embodiment, a computer program product includes a computer readable storage medium having program instructions embodied therewith, the program instructions readable and/or executable by a processor to cause the processor to: receive, by the processor, a request for a hypervisor to run a virtual machine, determine, by the processor, whether the virtual machine is authorized to run using a data structure having metadata about properties of the virtual machine, determine, by the processor, whether the hypervisor is authorized to run the virtual machine using a digital signature of the data structure, receive, by the processor, a decryption key from a key authority when it is determined that the virtual machine is authorized to be run and it is determined that the hypervisor is authorized to run the virtual machine, unlock, by the processor, and/or decrypting the virtual machine using the decryption key, and run, by the processor, the virtual machine.

In yet another general embodiment, a system includes a processor and logic integrated with and/or executable by the processor, the logic being configured to: receive a request for a hypervisor to run a virtual machine, determine whether the virtual machine is authorized to run using a data structure having metadata about properties of the virtual machine, determine whether the hypervisor is authorized to run the virtual machine using a digital signature of the data structure, receive a decryption key from a key authority when it is determined that the virtual machine is authorized to be run and it is determined that the hypervisor is authorized to run the virtual machine, unlock and/or decrypting the virtual machine using the decryption key, and run the virtual machine.

Figure 1:
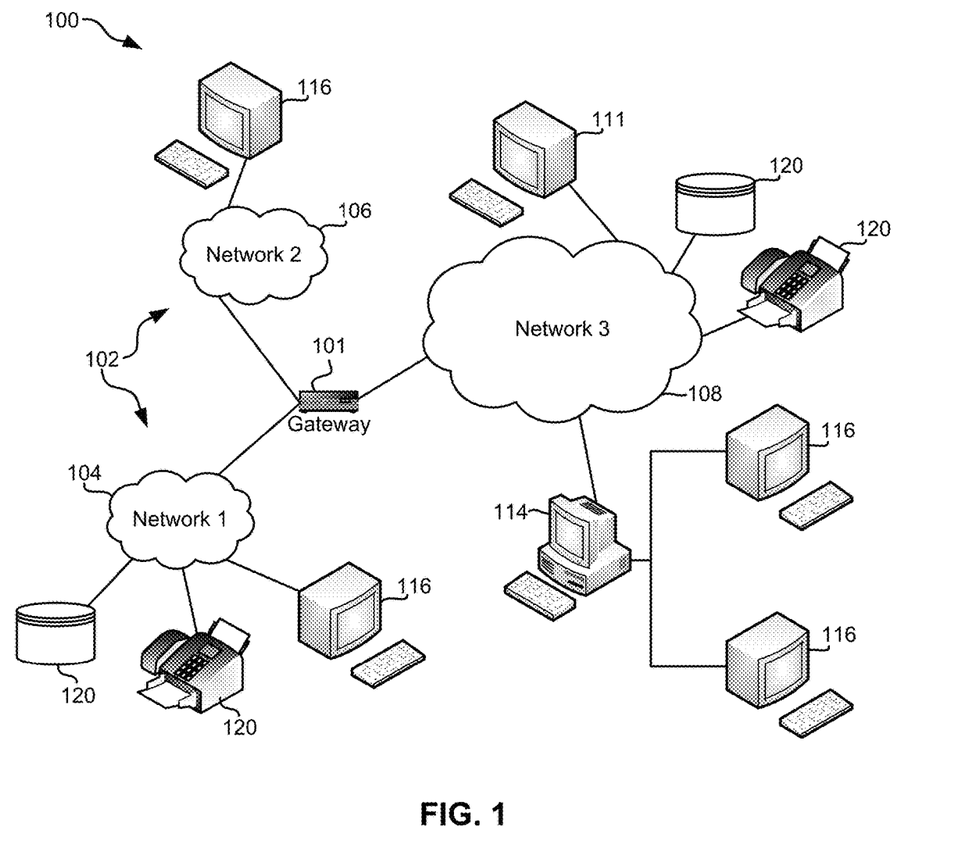
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network. For example, according to an illustrative embodiment, architecture 100 may include one or more hypervisors and/or VMs running on one or more of the servers 114 and/or user devices 111, 116. Furthermore, according to one approach, the hypervisors and/or VMs may be in communication with a key administrator via one or more of the networks 104, 106, 108, as will be described in further detail below.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
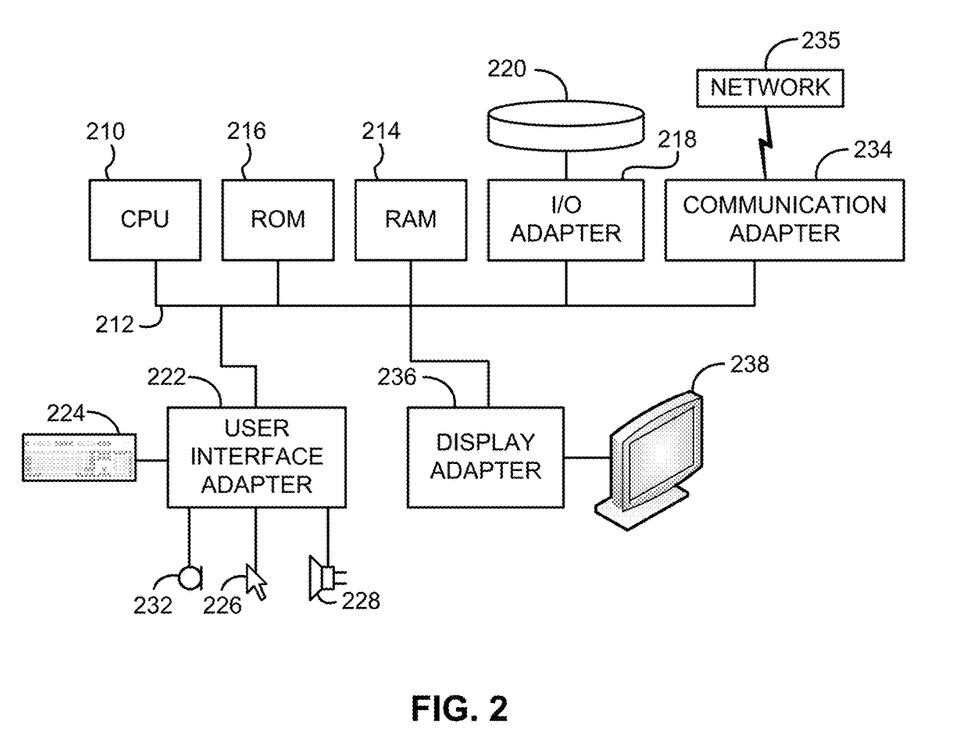
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

As described above, data protection and security are becoming increasingly important in virtualized networks. Today there is little other than standard antivirus programs that protect VMs and hypervisors, among other VM monitors. Often when a malicious VM is started, it can cause damage before even being recognized by these standard antivirus programs.

Moreover, once malicious software is introduced to a virtual network, it can be almost impossible to completely remove the malicious software from the user's portfolio of systems using current backup and replication practices. For example, in conventional products, once a given VM has been infected with a malicious program (e.g., a Trojan Horse program), that malicious program will be replicated and stored in all backup copies of the infected VM, which can number in the hundreds if not thousands. Thus, even if an administrator of a network were to detect and remove the VM originally infected, activation of any one of the hundreds or thousands of infected backup copies may reintroduce the malicious program to the network in conventional instances.

In sharp contrast, various embodiments described herein improve the protection in systems implementing hypervisors and/or VMs by incorporating several layers of security as will soon become apparent.

A hypervisor is a virtual machine monitor which may create and/or run VMs. As alluded to above, a virtual switch component in a host or a hypervisor usually provides the virtual ports which may be used to associate VMs to the various virtual networks.

Figure 3:
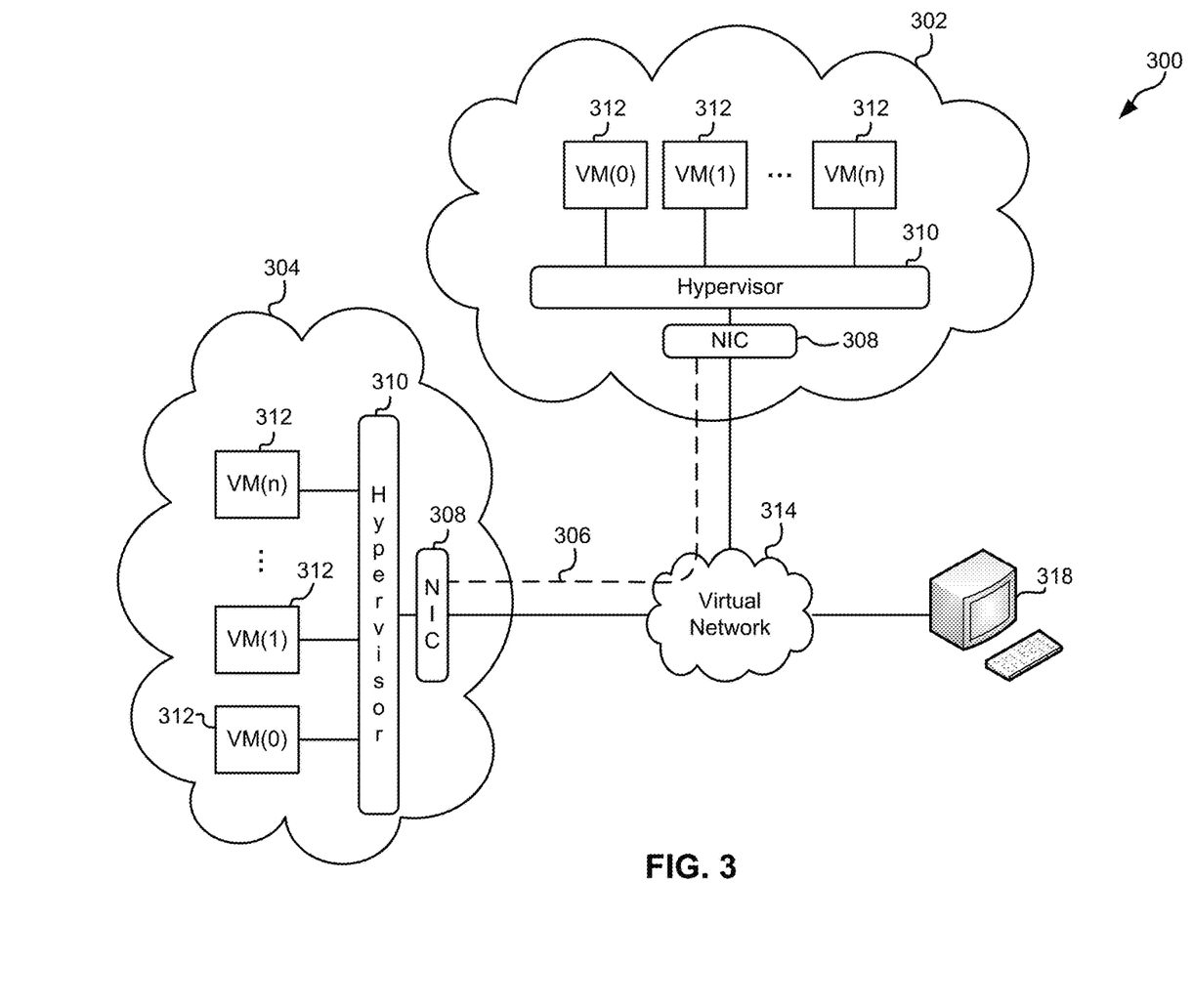
FIG. 3 is a system, in accordance with one embodiment.

FIG. 3 depicts a system 300, in accordance with one embodiment. As an option, the present system 300 may be implemented in conjunction with features from any other embodiment listed herein, such as those described with reference to the other FIGS., such as FIG. 1. Of course, however, such system 300 and others presented herein may be used in various applications and/or in permutations which may or may not be specifically described in the illustrative embodiments listed herein. Further, the system 300 presented herein may be used in any desired environment. Thus FIG. 3 (and the other FIGS.) may be deemed to include any possible permutation.

Referring momentarily to FIG. 3, the system 300 illustrated therein includes virtual network 314 which may use any number of VMs 312, e.g., depending on the desired embodiment. In one embodiment, virtual network 314 includes one or more VMs 312, while a second virtual network (not shown) may include one or more VMs. It follows that, according to some embodiments, VMs may not be shared by virtual networks, but instead are exclusively included in only one virtual network at any given time.

System 300 further includes hypervisors 310. According to some approaches, the hypervisors 310 may be capable of tunneling 306 through the virtual network 314 to each other. Of course, this is a simplified architecture, and many more tunnels may exist, and many more end point stations (where tunnels are originated or terminated) may be in the overlay network, as would be understood by one of skill in the art.

Each Hypervisor 310 may be connected to any number of VMs 312. In addition, a network interface card (NIC) 308 may be located on a downstream side of each Hypervisor 310. A virtual overlay network gateway (not shown) may further be provided to interface between virtual network 314, and any non-virtualized networks which may be present, any of which may be enabled for VXLAN or not. In addition, a server 318 may be provided which may also function as a tunnel end point station, in some approaches.

The system 300, and particularly the first end point station, in some embodiments, may include logic adapted for receiving, at the first end point station (which may be Hypervisor 310 in network 302, Hypervisor in network 304, server 318, etc.), an information exchange packet from each end point station in a virtual network having a specified VNID. The system 300 also may include logic adapted for processing each received information exchange packet to retrieve information about connections at each end point station in the virtual network having the specified VNID.

By being able to create and/or run VMs, a hypervisor has access to the data stored in the VMs. As a result, it is desirable that various embodiments included herein are able to verify the authorization and/or authenticity of each of the hypervisor and of the VMs before actually running a given VM, e.g., for security purposes.

VMs used in the various embodiments described herein are preferably created such that each has a data structure which includes information about the respective VM. In preferred approaches, the data structure includes metadata unique to the VM. Thus, a data structure of a given VM may include parameters such as a size, an operational overview, security level, etc. of that VM. It follows that VMs having similar or the same metadata may have data structures that are similar and/or the same. For example, two VMs that are the same size and which have the same operational functionality may have the same data structure. Moreover, the data structure may be in the form of a header according to some approaches, which is also referred to herein as a special header.

VM data structures may also be digitally signed by an authority, thereby creating a unique key for each particular VM. The unique key, and other keys described herein, may be created using techniques known in the art in conjunction with the teachings herein. Thus, although two similar VMs may have the same data structure, their digital signatures will be different and as a result their unique keys will be distinct. It is also preferred that unique keys of VMs cannot be changed (e.g., tampered with) without detection. Thus, according to different approaches, if an unauthorized change is made to a unique key, that change may be flagged, trigger an error message, alert a user, etc. However, in other approaches, the present condition of a unique key may be compared to the unique key as originally formed when the data structure was digitally signed, e.g., see operation 406 below. According to one approach, this originally formed unique key may be stored in memory, e.g., in a lookup table, such that it may be available for future use.

It follows that the data structure and unique key may be used in security frameworks which offer increased protection for hypervisors and/or VMs. Now referring to FIG. 4, a flowchart of a method 400 for achieving this increased protection is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Figure 4:
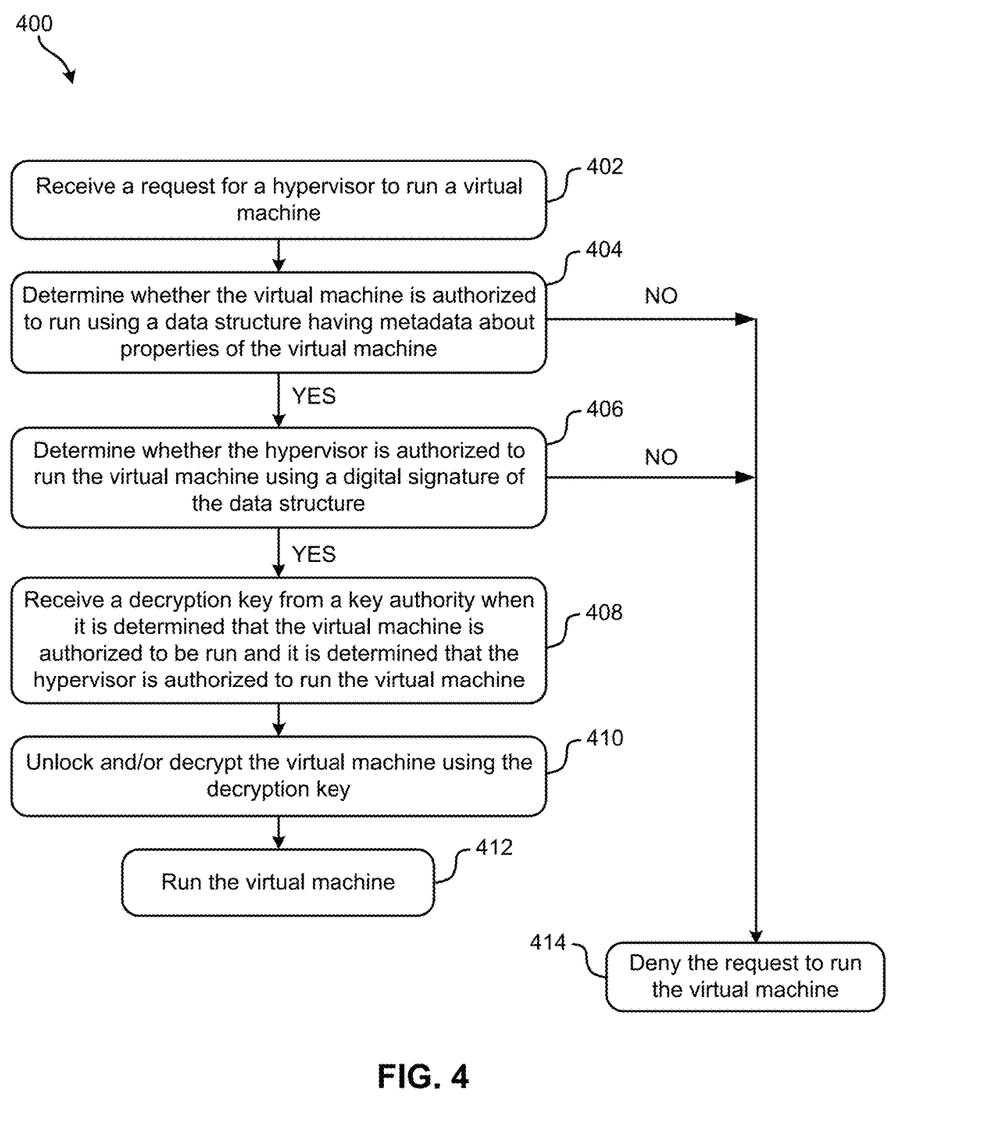
FIG. 4 is a flowchart of a method, in accordance with one embodiment.

Each of the steps of the method 400 may be performed by any suitable component of the operating environment. For example, in various embodiments, the method 400 may be partially or entirely performed by controllers, computers, processors, switches, routers, processing circuits, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, which includes receiving a request for a hypervisor to run a VM. Moreover, operation 404 includes determining whether the VM is authorized to run using a data structure of the VM which includes metadata about properties of the VM. In some approaches, the determination in operation 404 may be made upon reading the data structure of the VM and determining whether the data structure has been modified in any way, e.g., by comparing the current data structure with an original state of the data structure. In some approaches, operation 404 may be performed using a common authorization server.

Furthermore, method 400 further includes determining whether the hypervisor is authorized to run the VM using a digital signature of the data structure. See operation 406. For example, the determination may be made by the system running the hypervisor upon receiving a notification that the hypervisor is authorized to run the VM, e.g., by determining what the notification indicates. Although the present operation includes determining whether the hypervisor is authorized to run the VM, according to other approaches, operation 406 may alternatively include determining whether the VM is authorized to be run by the hypervisor. Furthermore, still other approaches may include determining whether the hypervisor is authorized to run the VM and/or determining whether the VM is authorized to be run by the hypervisor.

According to some approaches, authorized hypervisors may register with a key authority in order to prove the identity (e.g., authorization) of the hypervisors. Authorization may be proven using private and/or public keys corresponding to the hypervisor seeking authorization, e.g., such as the digital signature of the data structure. Private and/or public keys of a hypervisor in question may be compared to a list of keys of authorized hypervisors. Accordingly, authorization of the hypervisor in question may be proven if the key of the hypervisor matches one of those in the list of keys. The list of keys may be stored in any appropriate location. For example, according to some approaches, the list of keys may be stored in the key authority. In other approaches the list may be stored in the hypervisor itself. Further approaches may include a mechanism for validating the hypervisor itself, as will be described in further detail below.

Data stored on VMs are usually, but not always, protected by encrypted data. A protected VM file may include a small amount of unencrypted data (e.g., which may be header data) that contains the VM digital signature. The remainder of the protected VM file may remain encrypted via one or more keys. Encryption desirably prevents unauthorized users from running VMs and/or accessing the data stored thereon.

It follows that decryption keys for the encrypted VMs are preferably stored in a location different than the VMs and the hypervisors, e.g., to increase protection. According to one approach, the decryption key may be stored and/or managed by a key authority. Moreover, the key authority may make the decryption key available to the hypervisor when one or more predetermined conditions of a type known in the art are satisfied. Further still, communication between a hypervisor and a key authority may be encrypted in some approaches using any type of encryption scheme to ensure the validity of both the hypervisor and the key authority.

Thus, referring again to the embodiment illustrated in FIG. 4, if it is determined that the virtual machine is authorized to be run in operation 404 and it is also determined that the hypervisor is authorized to run the virtual machine in operation 406, method 400 proceeds to operation 408 which includes receiving a decryption key from a key authority. Upon receiving the decryption key, the VM may be unlocked and/or decrypted using the decryption key as seen in operation 410, after which the VM is run in operation 412.

Depending on the embodiment, the decryption key may enable decryption of all or part of an encrypted VM, which may be performed by a processor, computing device, the hypervisor itself, processors, switches, routers, processing circuits, etc. The amount of encryption enabled by the decryption key received from the key authority may depend on the security level of the VM, the sensitivity of the data stored therein, performance characteristics of the hypervisor, etc. A decryption key which enables decryption of an entirety of a VM may grant the hypervisor full access to the VM. However, an embodiment in which the decryption key enables decryption of only a portion of particular VM may include the hypervisor using a second decryption key to decrypt the remainder of the encrypted data. According to one approach, a decryption key may enable the decryption of a portion of a VM which includes a second decryption key stored therein, which in turn enables decryption of a remainder of the VM. Embodiments implementing additional decryption keys allow for the keys to be changed without having to decrypt and re-encrypt the entire VM data if there is a problem with one of the decryption keys, e.g., security breach, decryption error, etc.

However, referring again to the flowchart of FIG. 4, it should also be noted that if either one, or both, of operations 404, 406 are determined to not be satisfied, method 400 immediately proceeds to operation 414 in which the request received to run the VM in operation 402 is denied. For example, if a particular VM is authorized to run, but the hypervisor is not authorized to run that particular VM, the VM is not started and the run request is denied. Although not shown, upon denying the request to run the VM, method 400 may reset to an idle setting until another request to run a VM is received.

In addition to the determinations made in operations 404, 406 above, some embodiments may additionally perform cross validation between a hypervisor and a corresponding VM. Although it is desirable that cross validation is performed in addition to the determinations made in operations 404, 406 above, other embodiments may only implement the cross validation, e.g., depending on the desired level of security. It follows that some embodiment may include additional operations (e.g., any one or more of those illustrated in FIG. 5 below) in conjunction with those illustrated in FIG. 4.

Figure 5:
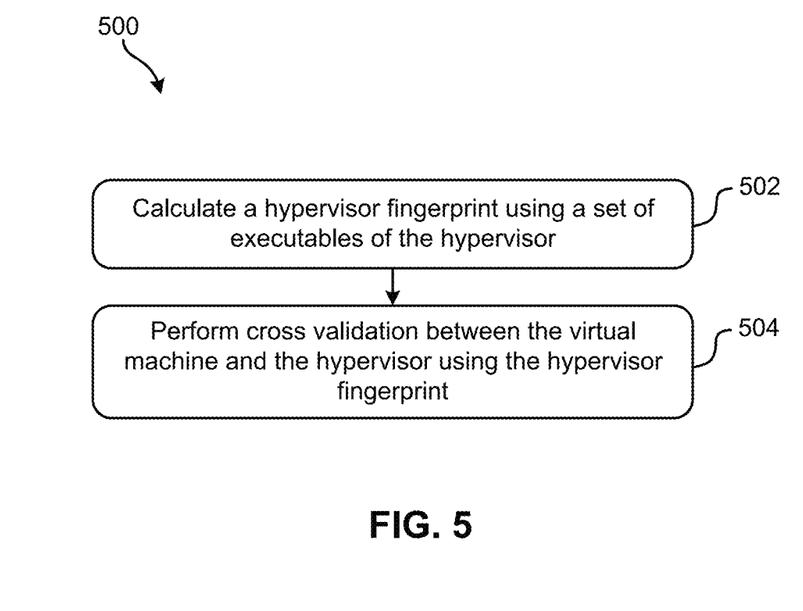
FIG. 5 is a flowchart of a method, in accordance with one embodiment.

Now referring to FIG. 5, a flowchart of a method 500 for achieving this increased protection is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by controllers, computers, processors, switches, routers, processing circuits, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, which includes calculating a hypervisor fingerprint using a set of executables of the hypervisor. The hypervisor fingerprint may be used to perform cross validation between a VM and a hypervisor as seen in operation 504. Moreover, after being calculated, a hypervisor fingerprint may be used in combination with a common authorization server to ensure that the Hypervisor itself has not been altered from an authorized state.

As a result, it is desirable that the various embodiment described herein include identifying a set of key static executables that make up the key core functionality of a hypervisor environment able to host and/or serve VMs. According to various approaches, each implementation may include a set of static executable code files which form the basis of the hypervisor's functions (e.g., differing from configuration files or other files which may be specific to a given environment). These static executable code files may be determined for each hypervisor implementation and potentially for a given release level of the code, such that they can be ordered in a known way to generate a repeatable cyclic redundancy check (CRC) or hash value. Moreover, the generated value may be shared with an authentication server, e.g., to confirm its validity. According to an example which is in no way intended to limit the invention, a hypervisor may have a file list of 20 key static executable files which form the key function of the hypervisor. Furthermore, this ordered file list of 20 key static executable files may be used to sequentially form the hash value (e.g., key) to be used in combination with the hypervisor. Moreover, executables may be identified by measuring, calculating, etc., or using any method which would be apparent to one skilled in the art upon reading the present description.

A determination may also be made as to whether the cross validation of operation 504 was successful. If it is determined that the cross validation between the VM and hypervisor succeeds, the hypervisor may be denoted as being authorized to run the VM. However, if it is determined that the cross validation failed, the hypervisor may not be authorized to run the VM, e.g., regardless of the data structure and/or unique key of the VM. Therefore, a failed cross validation between a hypervisor and a VM may result in the denial of a request for the hypervisor to run that VM.

Embodiments implementing a cross validation between a hypervisor and a corresponding VM preferably include the hypervisor and VM being in a pairing relationship which allows for cross validation. Moreover, cross validation may include a mechanism used to validate the authorization of a hypervisor. Various embodiments include different ways in which a hypervisor may be implemented in a system, e.g., such as architecture 100 of FIG. 1. This is in stark contrast to an average VM which is typically a file acting as a block device holding the entire image to run. It follows that validation of a hypervisor fingerprint with an authorization server includes a fingerprint (e.g., hash value) calculated using the primary executables forming the hypervisor functions, which may be used to ensure the hypervisor has not been tampered with.

According to different approaches, one or more of a number of policies may be applied to a "failed" authorization request of a hypervisor which is already running and serving VMs. These can include but are not limited to: sending an alert to administrators alerting them of the condition, requesting that running VMs of the failed hypervisor be transferred to another hypervisor before shutdown of the failed hypervisor, immediately terminating and/or aborting any currently running VMs, etc. For example, the validation process may provide an ability to revoke a once authorized hypervisor from continuing to serve one or more VMs upon "failing" a validation process with an authorization server.

In other approaches, failed authorization requests may cause key authorities to destroy or change decryption keys corresponding to the VMs requested to run. Such approaches allow for the key authorities to act as a last line of defense to ensure that unauthorized hypervisors and/or compromised VMs are not used to perform requested run operations.

The validation of a hypervisor hash value with an authorization server may be performed at various points in time which may be initiated by different trigger conditions. For example, a hypervisor hash value may be validated when a hypervisor is initiated and/or receives a run request. However, in other approaches a hypervisor hash value may be validated at each iteration of a lease period or a time interval. In other words, a hypervisor may be required to re-establish its authorization to run one or more VM every hour, or any other time interval of a desired length. Hypervisors are typically started less frequently than VMs are started and typically undergo longer run periods than VMs. As a result, it may be preferred that in some approaches, a hypervisor is required to re-establish authorization at a different frequency than VMs. According to some approaches, a hypervisor may be required to re-establish authorization less frequently than VMs.

Security may be further enhanced for certain embodiments by ensuring the hypervisor is not tampered with in any way. This may be achieved by using standard code signing techniques which are able to detect when a unique key of a VM has been tampered with. Thus, according to different approaches, if an unauthorized change is made to a unique key, that change may be flagged, trigger an error message, alert a user, etc., thereby providing an additional layer of security.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   determining, using a processor, whether a virtual machine is authorized to run using a data structure having metadata about properties of the virtual machine;
   determining, using the processor, whether a hypervisor is authorized to run the virtual machine using a digital signature of the data structure; and
   running the virtual machine on a computer system using the hypervisor in response to determining that the virtual machine is authorized to be run and that the hypervisor is authorized to run the virtual machine.

2. The computer-implemented method of claim 1, wherein determining whether the hypervisor is authorized to run the virtual machine includes:
   calculating a hypervisor fingerprint using a set of executables of the hypervisor; and
   performing cross validation between the virtual machine and the hypervisor using the hypervisor fingerprint.

3. The computer-implemented method of claim 2, comprising:
   denying a request for the hypervisor to run the virtual machine in response to the cross validation being unsuccessful.

4. The computer-implemented method of claim 2, wherein the set of executables of the hypervisor include a set of static executable code files which form key functions of the hypervisor.

5. The computer-implemented method of claim 1, comprising: destroying and/or changing a decryption key corresponding to the virtual machine in response to determining that the hypervisor is not authorized to run the virtual machine.

6. The computer-implemented method of claim 1, comprising:
   receiving a decryption key from a key authority when it is determined that the virtual machine is authorized to be run and it is determined that the hypervisor is authorized to run the virtual machine; and
   unlocking and/or decrypting the virtual machine using the decryption key.

7. The computer-implemented method of claim 6, wherein the decryption key enables decryption of a second decryption key stored in the virtual machine, wherein the second decryption key enables decryption of a remainder of the virtual machine.

8. The computer-implemented method of claim 1, wherein the data structure includes a header having the metadata, wherein the header is digitally signed with the digital signature.

9. A computer program product comprising a computer readable storage medium having program instructions embodied therewith, wherein the computer readable storage medium is not a transitory signal per se, the program instructions readable and/or executable by a processor to cause the processor to perform a method comprising:
   determining, by the processor, whether a virtual machine is authorized to run using a data structure having metadata about properties of the virtual machine;
   determining, by the processor, whether a hypervisor is authorized to run the virtual machine using a digital signature of the data structure; and
   running, by the processor, the virtual machine on a computer system using the hypervisor in response to determining that the virtual machine is authorized to be run and that the hypervisor is authorized to run the virtual machine.

10. The computer program product of claim 9, wherein determining whether the hypervisor is authorized to run the virtual machine includes:
    calculating a hypervisor fingerprint using a set of executables of the hypervisor; and
    performing cross validation between the virtual machine and the hypervisor using the hypervisor fingerprint.

11. The computer program product of claim 10, the program instructions readable and/or executable by the processor to cause the processor to perform the method comprising: sending, by the processor, a request that virtual machines running on the hypervisor be transferred to a second hypervisor before shutdown of the hypervisor in response to the cross validation being unsuccessful.

12. The computer program product of claim 10, the program instructions readable and/or executable by the processor to cause the processor to perform the method comprising: immediately terminating, by the processor, any virtual machines being run using the hypervisor in response to the cross validation being unsuccessful.

13. The computer program product of claim 10, the program instructions readable and/or executable by the processor to cause the processor to perform the method comprising:
    repeating, by the processor, the cross validation between the virtual machine and the hypervisor using the hypervisor fingerprint at each iteration of a time interval; and
    terminating, by the processor, the virtual machine being run using the hypervisor in response to any of the repeat cross validations being unsuccessful.

14. The computer program product of claim 9, the program instructions readable and/or executable by the processor to cause the processor to perform the method comprising: destroying and/or changing, by the processor, a decryption key corresponding to the virtual machine in response to determining that the hypervisor is not authorized to run the virtual machine.

15. The computer program product of claim 14, wherein the decryption key enables decryption of an entirety of the virtual machine.

16. The computer program product of claim 9, wherein the metadata is used to ascertain whether the data structure has been modified from an original state.

17. A system, comprising:
    a processor and logic integrated with and/or executable by the processor, the logic being configured to:
    determine whether a virtual machine is authorized to run using a data structure having metadata about properties of the virtual machine;
    determine whether a hypervisor is authorized to run the virtual machine using a digital signature of the data structure; and
    run the virtual machine on a computer system using the hypervisor in response to determining that the virtual machine is authorized to be run and that the hypervisor is authorized to run the virtual machine.

18. The system of claim 17, wherein the logic is configured to:
    calculate a hypervisor fingerprint using a set of executables of the hypervisor; and
    perform cross validation between the virtual machine and the hypervisor using the hypervisor fingerprint, wherein the set of executables of the hypervisor include a set of static executable code files which form key functions of the hypervisor.

19. The system of claim 18, wherein the logic is configured to: perform an action in response to the cross validation being unsuccessful, the action being selected from a group of actions consisting of: sending an alert to a user, sending a request that virtual machines running on the hypervisor be transferred to a second hypervisor before shutdown of the hypervisor, and immediately terminating any virtual machines being run using the hypervisor.

20. The system of claim 18, wherein the logic is configured to:
- repeat the cross validation between the virtual machine and the hypervisor using the hypervisor fingerprint at each iteration of a time interval;
- terminate the virtual machine being run using the hypervisor in response to any of the repeat cross validations being unsuccessful; and
- destroy and/or change a decryption key corresponding to the virtual machine in response to determining that the hypervisor is not authorized to run the virtual machine.

* * * * *